US009278456B2

(12) United States Patent
Shen et al.

(10) Patent No.: US 9,278,456 B2
(45) Date of Patent: Mar. 8, 2016

(54) HIGH SPEED TRAVERSING SHEAR

(71) Applicants: William Xiaolan Shen, Boylston, MA (US); Keith E. Fiorucci, Sturbridge, MA (US); Christopher D. Lashua, Gardner, MA (US); Kenneth Plante, Holden, MA (US)

(72) Inventors: William Xiaolan Shen, Boylston, MA (US); Keith E. Fiorucci, Sturbridge, MA (US); Christopher D. Lashua, Gardner, MA (US); Kenneth Plante, Holden, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 181 days.

(21) Appl. No.: 13/922,696

(22) Filed: Jun. 20, 2013

(65) Prior Publication Data

US 2014/0373695 A1 Dec. 25, 2014

(51) Int. Cl.

*B23D 25/12* (2006.01)
*B26D 5/08* (2006.01)
*B26D 1/00* (2006.01)
*B26D 1/01* (2006.01)
*B26D 7/06* (2006.01)
*B26D 7/27* (2006.01)

(Continued)

(52) U.S. Cl.

CPC .............. *B26D 5/08* (2013.01); *B21B 15/0007* (2013.01); *B26D 1/0006* (2013.01); *B26D 1/01* (2013.01); *B26D 7/06* (2013.01); *B26D 7/27* (2013.01); *B21B 1/16* (2013.01); *B21B 2015/0014* (2013.01); *B26D 2001/004* (2013.01); *Y10T 83/505* (2015.04)

(58) Field of Classification Search

CPC ...... B23D 25/08; B23D 25/12; B26D 1/0006; B26D 1/01; B26D 2001/004; B26D 5/08; B26D 7/06; B26D 7/27; B21B 15/0007; B21B 1/16; B21B 2015/0014

USPC ............................ 83/304, 306, 343, 344, 345

See application file for complete search history.

(56) References Cited

U.S. PATENT DOCUMENTS 1,799,749 A 4/1931 Hoopes
3,566,725 A 3/1971 Sutyak
3,894,455 A 7/1975 Stroobants (Continued)

FOREIGN PATENT DOCUMENTS

CH 698243 B1 6/2009
EP 0796692 A1 9/1997
EP 1043102 A2 10/2000

OTHER PUBLICATIONS

PCT International Search Report mailed Sep. 19, 2014 corresponding to PCT International Application No. PCT/US2014/040145 filed May 20, 2014. (10 pages).

(Continued)

*Primary Examiner* — Stephen Choi
(74) *Attorney, Agent, or Firm* — Gesmer Updegrove LLP

(57) ABSTRACT

A trim shear is adapted to trim the front and tail ends of a hot rolled product exiting from a rolling mill along a mill pass line and travelling at either high or low speeds, depending on the size of the product being rolled. The trim shear comprises a trim station having a high speed a set of trim knives configured and arranged to trim the front and tail ends of high speed products. A different low speed set of trim knives are disposed laterally from the high speed set of trim knives and configured and arranged to trim the front and tail ends of low speed products. The trim station is shifted transversely with respect to the mill pass line to alternatively locate either one or the other of the sets of trim knives in an active position on the mill pass line.

8 Claims, 5 Drawing Sheets

(51) Int. Cl.
*B21B 15/00* (2006.01)
*B21B 1/16* (2006.01)

(56) References Cited

U.S. PATENT DOCUMENTS

| | | | | | |
|---|---|---|---|---|---|
| 4,062,259 | A | * | 12/1977 | Sclippa | 83/285 |
| 4,627,320 | A | * | 12/1986 | Fuccaro | 83/163 |
| 5,732,609 | A | | 3/1998 | Marschke | |
| 5,857,370 | A | * | 1/1999 | Grenz et al. | 72/203 |
| 6,070,510 | A | * | 6/2000 | Poloni | 83/37 |
| 2002/0092391 | A1 | * | 7/2002 | Shen et al. | 83/105 |
| 2006/0278054 | A1 | | 12/2006 | Zhang | |
| 2008/0083312 | A1 | | 4/2008 | Zschoche | |
| 2011/0017038 | A1 | | 1/2011 | Shen | |
| 2011/0303063 | A1 | | 12/2011 | Holbert | |
| 2012/0140011 | A1 | | 6/2012 | Maeyama | |
| 2012/0198978 | A1 | * | 8/2012 | Shen | 83/78 |

OTHER PUBLICATIONS

Assessment of enhancing the performance and wear characteristics of high speed steel circular saw blades through ion implantation; S.R. Bradbury, D.B. Lewis, and M. Sarwar; Jul. 30, 1995; 6 pages.

* cited by examiner

HIGH SPEED TRAVERSING SHEAR

BACKGROUND

1. Field

Aspects of the present invention relate to rolling mills producing hot rolled products at either high or low delivery speeds, and more particularly to an improved trim shear for trimming the front and tail ends of the entire speed range of such products.

2. Description of Related Art

As herein employed, and by way of example only and without limitation, the term “high speed” means speeds higher than about 80 m/sec, and the term “low speed” means speeds lower than about 79 m/sec. Typically, and again without limitation, products having diameters ranging from between about 4.0-9.9 mm are produced at high speeds, and products having diameters ranging from between about 10.0-25.0 mm are produced at low speeds.

Conventional high speed trim shears typically employ one set of trim knives to trim the front and tail ends of the entire range of products exiting from the mill at either high or low speeds, and one set of chopping knives to chop the trimmed front and tail ends into shorter scrap lengths. A pivotal switch delivers the products to the trim knives, and a single three channel delivery guide directs the trimmed front and tail ends to the chopping knives while allowing the main length of the product to continue on for further downstream processing and/or handling.

The use of one set of trim knives and one delivery guide has been seen to significantly compromise shear performance when handling high speed products. Of necessity, the spacing between the shear knives and the size of and spacing between the delivery guide’s entry bell mouths and guide troughs must be large enough to accommodate the larger low speed products. The wide spacing between the shear knives requires the switch to pivot through large angles, which can be problematic when delivering the relatively limber high speed products. Also, the enlarged entry bell mouths and guide troughs do not provide adequate support and guidance for the smaller high speed products.

SUMMARY

In accordance with exemplary embodiments of the present invention to be described hereinafter in greater detail, the trim shear has a trim station with a set of high speed trim knives for trimming the front and tail ends of high speed products, and a laterally disposed different set of low speed trim knives for trimming the front and tail ends of low speed products. A traversing mechanism shifts the trim station transversely with respect to the mill pass line to alternatively locate one or the other of the sets of high or low speed trim knives in an active position on the mill pass line.

Each set of trim knives may advantageously comprise continuously rotatable front end trim knives laterally spaced from continuously rotatable tail end trim knives by a pass through path devoid of trim knives. When a set of trim knives is actively positioned, its pass through path is aligned with the mill pass line.

In accordance with one aspect of the present invention, a switch in advance of the trim station pivotally directs a product across an actively positioned set of trim knives in the following sequence:

(a) to the front end trim knives to sever the product front end;

(b) from the front end trim knives to the pass through path, allowing continued movement of the product along the mill pass line; and (c) from the pass through path to the tail end trim knives to sever the product tail end.

In accordance with another aspect of the present invention, a chopping station is arranged in series with the trim station along the mill pass line. The chopping station has a set of high speed chopping knives configured and arranged to chop the front and tail ends of high speed products, and a different set of low speed chopping knives configured and arranged to chop the front and tail ends of low speed products. The sets of high and low speed chopping knives are aligned respectively with the sets of high and low speed trim knives. The traversing mechanism is operable to shift the chopping station transversely with respect to the mill pass line to alternatively locate one or the other of the sets of high or low speed chopping knives in an active position on the mill pass line. The chopping knives may each comprise continuously rotatable front end chopping knives separated from continuously rotatable tail end chopping knives by a pass through path devoid of chopping knives.

Advantageously, the trim station and chopping station may be mounted on a common bed, with the traversing mechanism serving to shift the bed transversely with respect to the mill pass line.

In accordance with still another aspect of the present invention, a delivery guide is arranged at a guide station between the trim station and the chopping station. The delivery guide has laterally disposed high and low speed sections. The high speed section has front and tail end high speed guide paths separated by a high speed pass through path. The high speed paths are dimensioned to provide the close support and guidance required to effectively guide the smaller diameter high speed products. The low speed section is similarly provided with front and tail end low speed guide paths separated by a low speed pass through path. The low speed paths are more generously proportioned to handle the larger low speed products. The high and low speed delivery guide sections may be combined in a single unit that is laterally shiftable together with the trim and chopping stations. Alternatively, the high and low speed guide sections may comprise separate units that are employed alternatively at the guide station.

DETAILED DESCRIPTION

Figure 1:
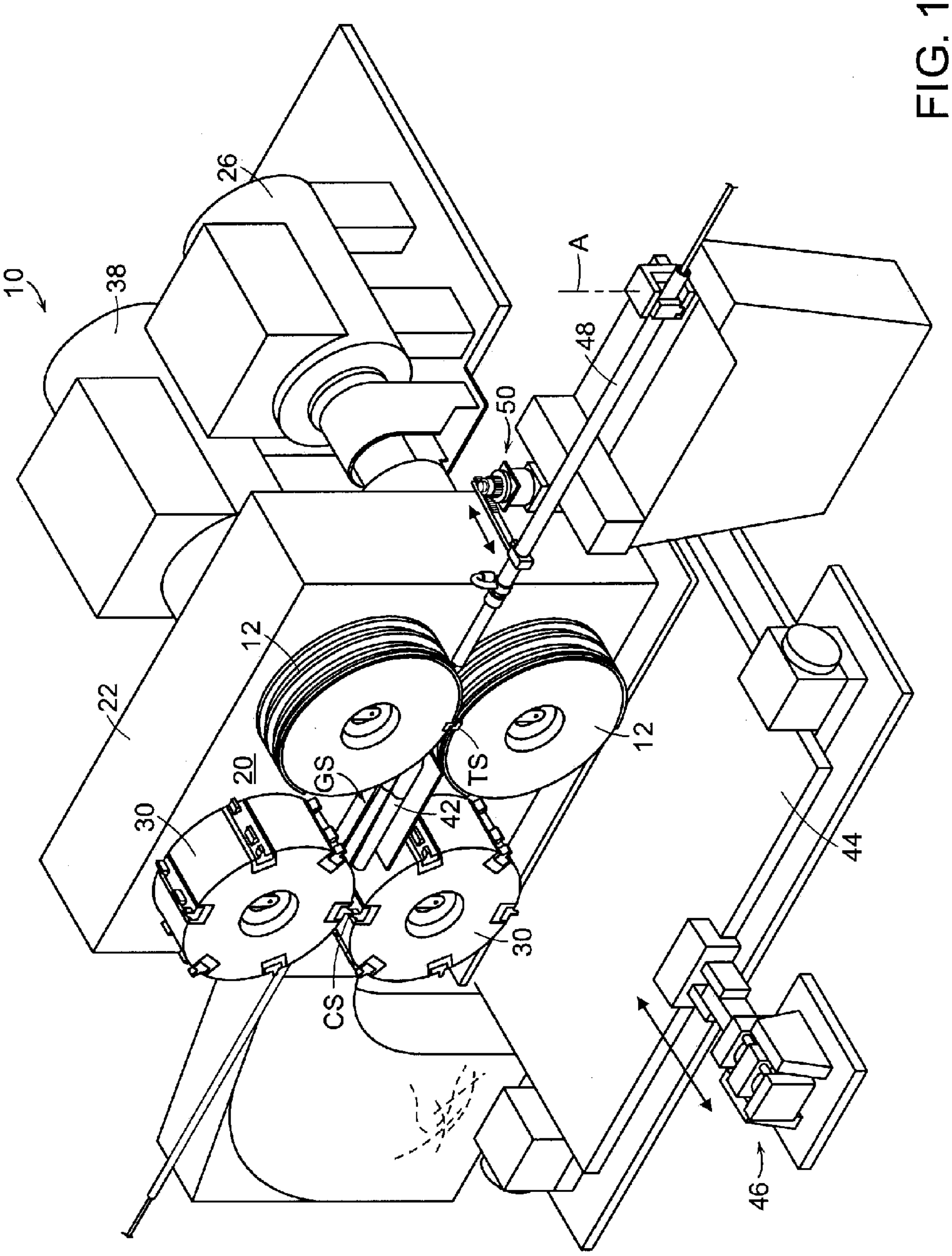
FIG. 1 is a perspective view of a trim shear in accordance with an exemplary embodiment of the present invention.
Figure 2:
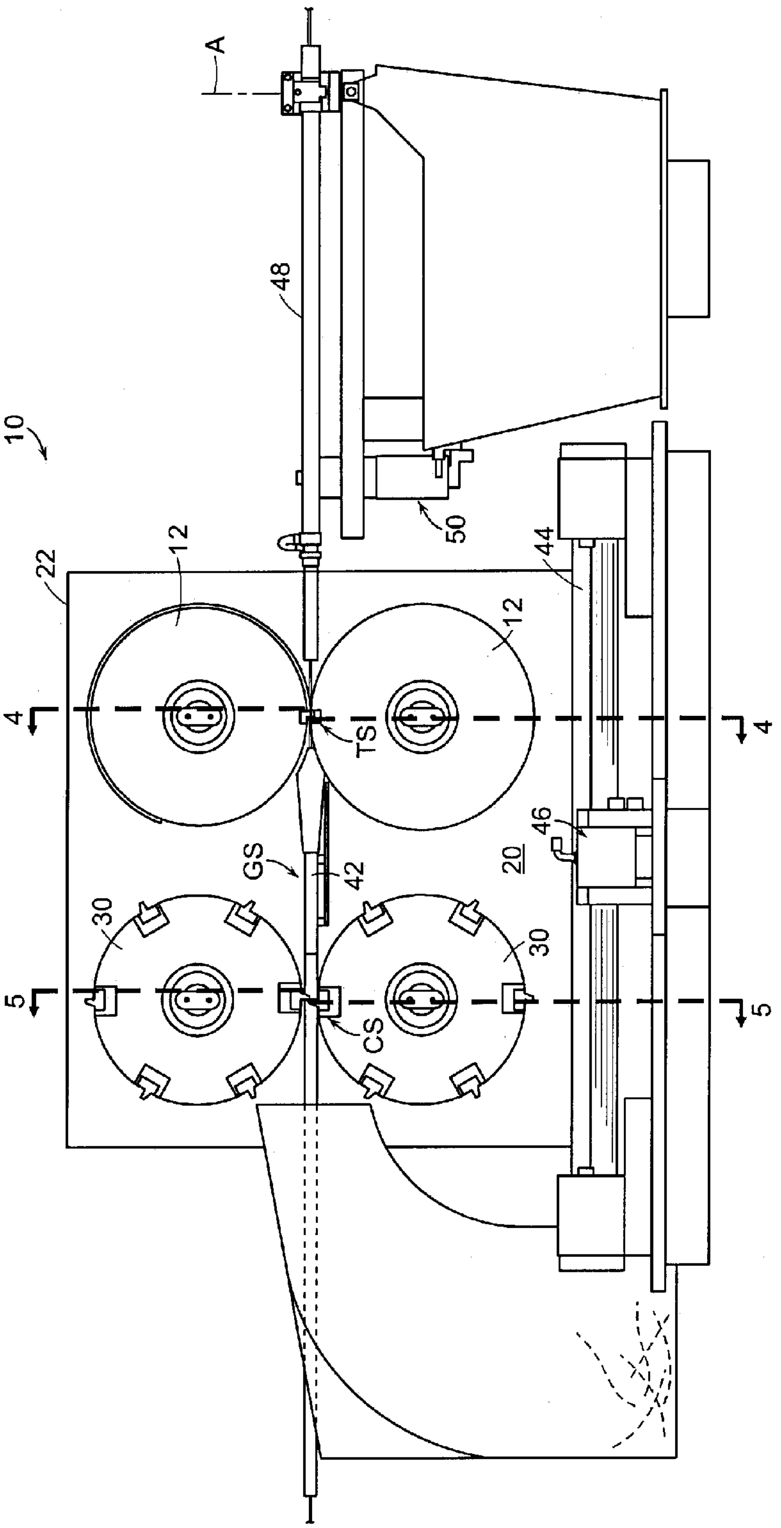
FIG. 2 is a front side view of the trim shear depicted in FIG. 1.
Figure 3:
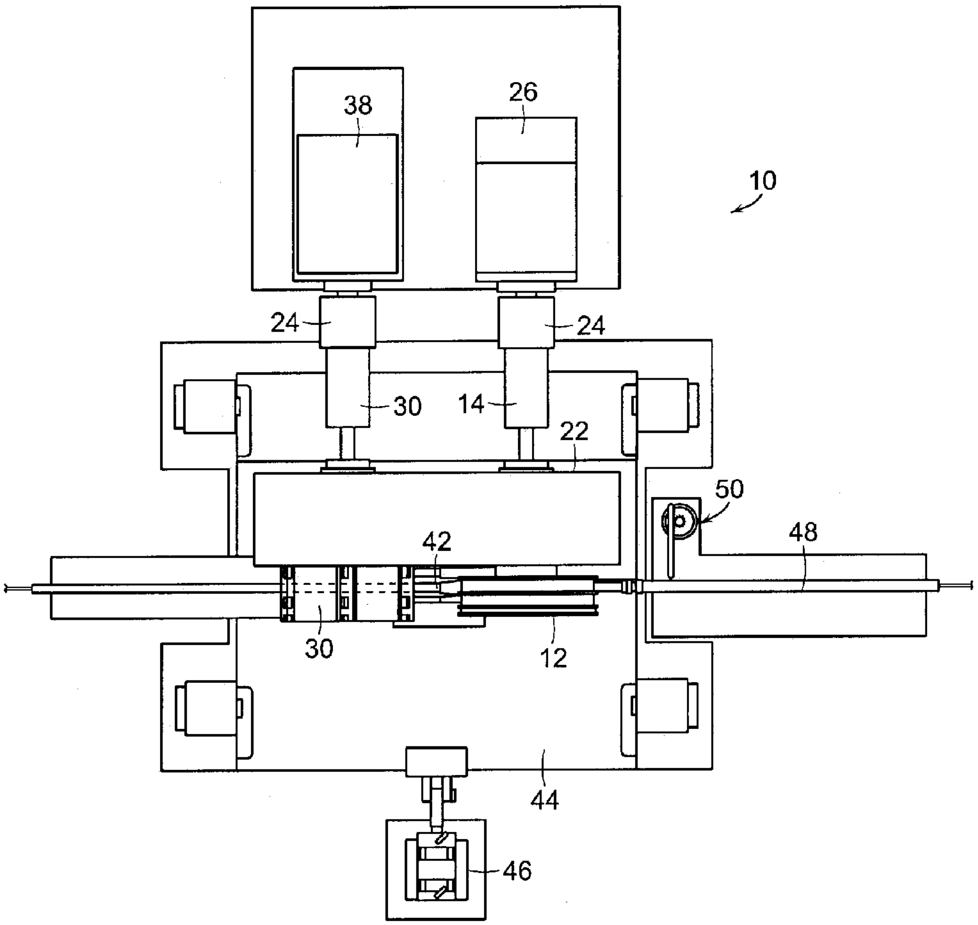
FIG. 3 is a top plan view of the trim shear depicted in FIG. 1.
Figure 5:
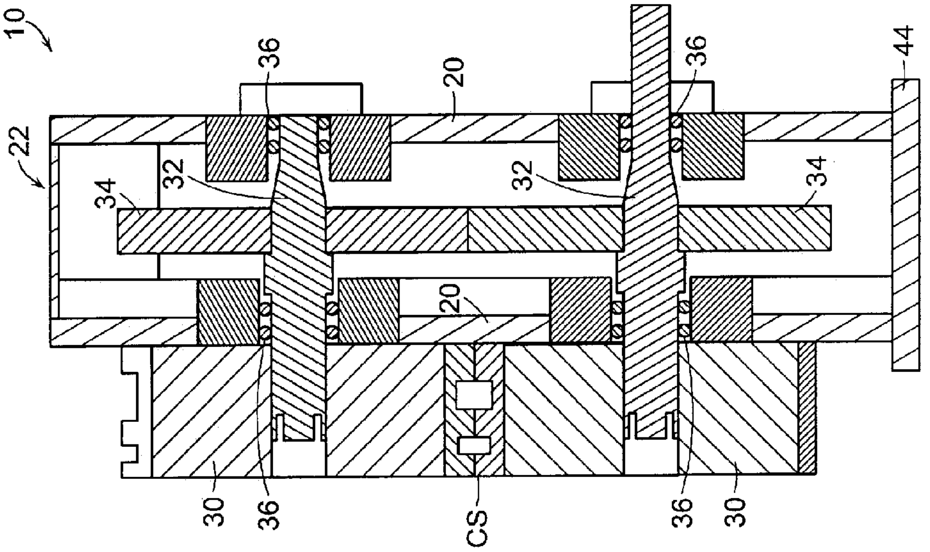
FIGS. 4 and 5 are sectional views taken respectively along lines 4-4 and 5-5 of FIG. 2.
Figure 4:
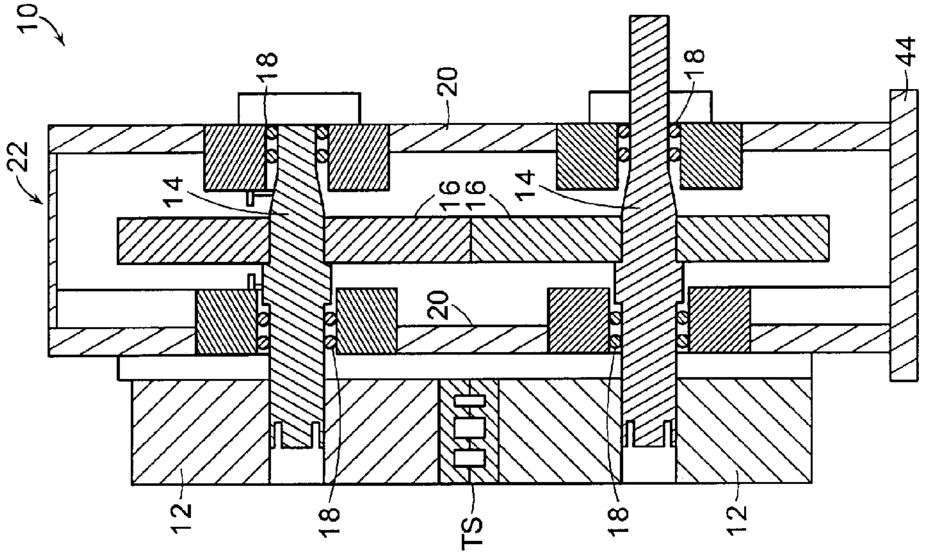

With reference initially to FIGS. 1-5, a trim shear in accordance with an illustrative embodiment of the present invention is generally depicted at 10. The trim shear has a first set of rotors 12 carried on shafts 14 mechanically coupled by intermeshed gears 16. The shafts 14 are journalled for rotation between bearings 18 in the side walls 20 of a housing 22, with one of the shafts 14 being connected via a telescoping coupling 24 to a drive motor 26. The rotors 12 carry trim knives configured and arranged to rotatably coact at a trim station "TS".

A second pair of rotors 30 are carried on shafts 32 also mechanically coupled by intermeshed gears 34. The shafts 32 are journalled for rotation between bearings 36 in the housing side walls 20, with one of the shafts being separately driven via a telescoping coupling 24 by a second drive motor 38. The rotors 30 carry chopping knives configured and arranged to rotatably coact at a chopping station "CS" arranged in series with the trim station TS along the mill pass line "PL".

A delivery guide 42 is arranged at a guide station "GS" between the trim station TS and the chopping station CS.

The shear housing 22 is carried on a bed 44. The bed is shiftable in opposite directions transverse to the mill pass line PL by a traversing mechanism 46 which may comprise a hydraulic linear actuator or other functionally equivalent device. The drive motors 26, 38 are stationary, with the telescoping couplings 24 providing uninterrupted drive connections as the bed 44 is shifted by the traversing mechanism 46.

A switch, which may be in the form of a pipe 48 or other path defining guide, is arranged upstream of the trim station TS. The switch pipe 48 has an entry end aligned with the mill pass line PL, and is pivotally adjustable about a vertical axis "A" by a mechanism 50 that may comprise a rack and motor driven pinion or other functionally equivalent device.

Figure 6:
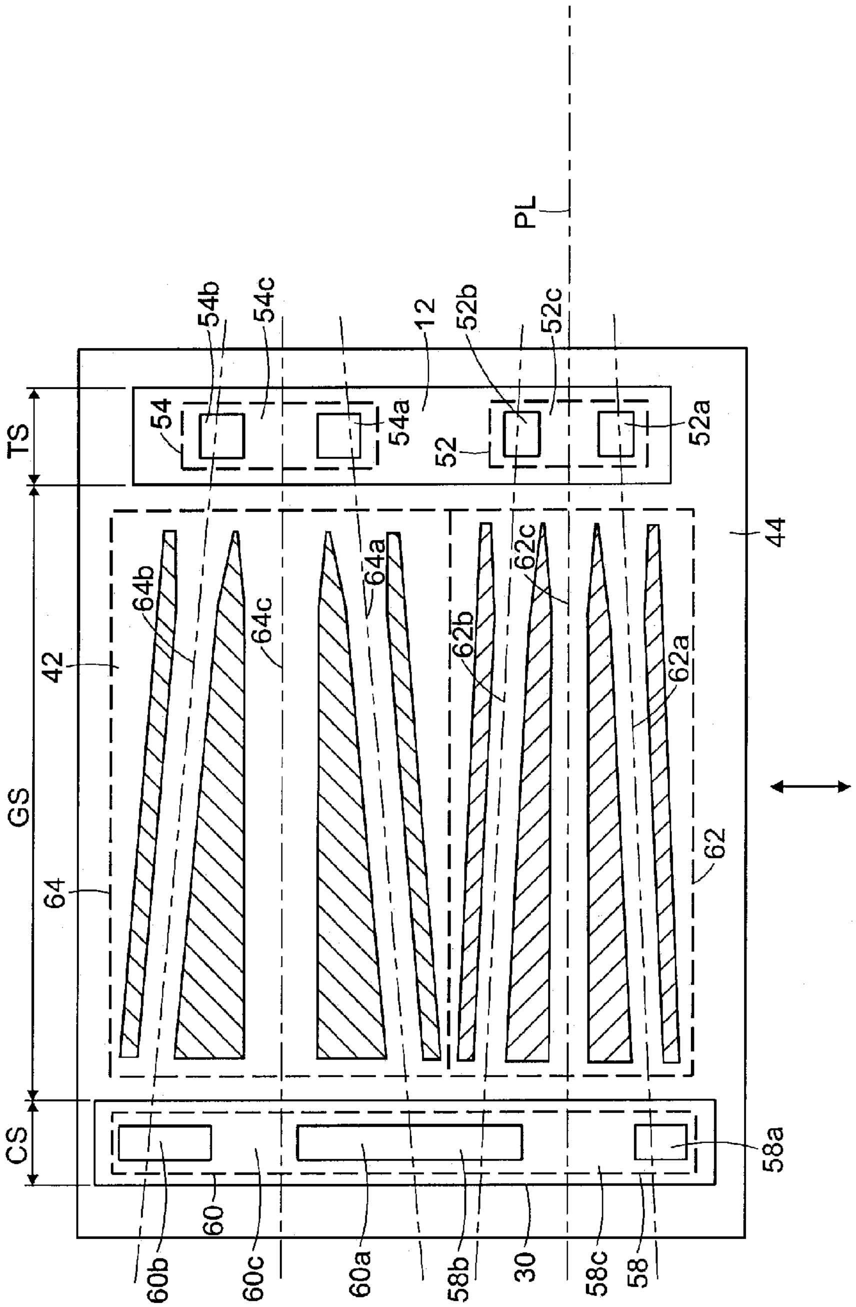
FIG. 6 is a diagrammatic illustration of components at the trim station, delivery guide station and chopping station of a trim shear in accordance with an exemplary embodiment of the present invention.

As shown in FIG. 6, the trim station TS has a high speed set 52 of trim knives 52*a*, 52*b* laterally separated by a high speed pass through path 52*c*, and a low speed set 54 of trim knives 54*a*, 54*b* separated by a low speed pass through path 54*c*.

The chopping station CS has a set 58 of high speed chopping knives 58*a*, 58*b* separated by a high speed pass through path 58*c*, and a set 60 of low speed chopping blades 60*a*, 60*b* separated by a low speed pass through path 60*c*.

The delivery guide 42 at the guide station GS has laterally disposed high and low speed sections 62, 64. The high speed section 62 has high speed front and tail end guide paths 62*a*, 62*b* separated by a high speed pass through path 62*c*. The high speed paths 62*a*, 62*b* and 62*c* are dimensioned to provide close support and guidance for smaller diameter high speed products.

The low speed section 64 is similarly provided with low speed front and tail end guide paths 64*a*, 64*b* separated by a low speed pass through path 64*c*. The low speed paths 64*a*, 64*b* and 64*c* are more generously proportioned to handle the larger diameter slow speed products.

In FIG. 6, the trim shear 10 is depicted in a high speed mode. The bed 44 has been traversed to align the high speed pass through paths 52*c*, 62*c* and 58*c* with the mill pass line PL. In this mode, the switch 48 is operable to initially direct a high speed front end to the trim knives 52*a* to trim the front end, which continues along guide path 62*a* to the chopping knives 58*a*. The switch then pivots to direct the main product length along the pass through paths 52*c*, 62*c* and 58*c*. As the tail end approaches, the switch pivots further to direct the tail end to the high speed trim knives 52*b*. The trimmed tail end continues along guide path 62*b* to the chopping knives 58*b*.

Although not shown, it is to be understood that when the shear is operating in a low speed mode, the bed 44 has been traversed to align the low speed pass through paths 54*c*, 64*c* and 60*c* with the mill pass line PL. In this mode, the switch 48 is operable to initially direct a low speed front end to the trim knives 54*a* to trim the front end, which continues along guide path 64*a* to the chopping knives 60*a*. The switch then pivots to direct the main product length along the pass through paths 54*c*, 64*c* and 60*c*. The switch then pivots further to direct the low speed tail end to the low speed trim knives 54*b* to sever the tail end, which then continues along guide path 64*b* to the chopping knives 60*b*.

As depicted in FIG. 6, the high and low speed sections 62, 64 of the delivery guide 42 are incorporated into a single unit designed to undergo lateral shifting with the trim and chopping stations TS and CS. However, the two delivery guide sections 62, 64 may be divided into separate units that may be installed alternatively between the trim and chopping stations.

While the present invention has been described in connection with exemplary embodiments thereof, it is to be understood that this is by way of illustration and not of limitation, and that the scope of the appended claims should be construed as broadly as the prior art will permit.

We claim:

1. A trim shear for trimming the front and tail ends of a hot rolled product exiting from a rolling mill along a mill pass line and travelling at either high or low speeds, depending on the size of the product being rolled, said trim shear comprising:

a trim station having a high speed a set of trim knives configured and arranged to trim the front and tail ends of high speed products, and a different low speed set of trim knives disposed laterally from said high speed set of trim knives and configured and arranged to trim the front and tail ends of low speed products, wherein said high speed set of trim knives comprises continuously rotatable front end trim knives laterally spaced from continuously rotatable tail end trim knives by a high speed pass through devoid of trim knives, and wherein said low speed set of trim knives comprises continuously rotatable front end trim knives laterally spaced from continuously rotatable tail end trim knives by a low speed pass through path devoid of trim knives; a chopping station arranged in series with said trim station along the mill pass line, said chopping station having a set of high speed chopping knives configured and arranged to chop the front and tail ends of high speed products, and a different set of low speed chopping knives configured and arranged to chop the front and tail ends of low speed products, wherein said high speed sets of chopping knives comprises continuously rotatable front end chopping knives laterally spaced from continuously rotatable tail end chopping knives by a high speed pass through path devoid of chopping knives, and wherein said low speed set of chopping knives comprises continuously rotatable front end chopping knives laterally spaced from continuously rotatable tail end chopping knives by a low speed pass through path devoid of chopping knives; the high and low speed pass through paths of said sets of high and low speed chopping knives being aligned respectively with the high and low speed pass through paths of said sets of high and low speed trim knives; and, traversing means operable to shift both said trim station and said chopping station transversely in unison with respect to the mill pass line.

2. The trim shear of claim 1 further comprising switch means for directing a product across an actively positioned set of trim knives in the following sequence:

(a) to the front end trim knives to sever the product front end;

(b) from the front end trim knives to the pass through path, allowing continued movement of said product along the mill pass line; and (c) from the pass through path to the tail end trim knives to sever the product tail end.

3. The trim shear of claim 1 further comprising a delivery guide at a guide station located between said trim station and said chopping station.

4. The trim shear of claim 3 wherein said delivery guide has laterally disposed high and low speed sections, said high speed section having front and tail end high speed guide paths separated by a high speed through path, and said low speed section having front and tail end low speed guide paths separated by a low speed through path, said high speed paths being dimensioned to provide close support and guidance for high speed products, and said low speed paths being more generously proportioned in comparison to said high speed paths to handle said slow speed products.

5. The trim shear of claim 4 wherein said high speed and low speed delivery guide sections are combined in a single unit that is laterally shiftable with said trim and chopping stations.

6. The trim shear of claim 4 wherein said high speed and low speed delivery guide sections comprise separate units that are alternatively employable at said guide station.

7. The trim shear of claim 1 wherein said trim station and said chopping station are carried on a common bed, and wherein said traversing means serves to shift said bed transversely with respect to the mill pass line.

8. A trim shear for trimming the front and tail ends of a hot rolled product exiting from a rolling mill along the mill pass line and travelling at either high or low speeds, depending on the size of the product being rolled, said apparatus comprising:

a trim station having laterally disposed sets of high speed and low speed trim knives, each set of trim knives comprising front end trim knives laterally spaced from tail end trim knives by a pass through path, wherein each of said sets of trim knives comprises continuously rotatable front end trim knives laterally spaced from continuously rotatable tail end trim knives by a pass through path devoid of trim knives;

a chopping station arranged in series with said trim station along the mill pass line, said chopping station having a set of high speed chopping knives configured and arranged to chop the front and tail ends of high speed products, and a different set of low speed chopping knives configured and arranged to chop the front and tail ends of low speed products, wherein said high speed set of chopping knives comprises continuously rotatable front end chopping knives laterally spaced from continuously rotatable tail end chopping knives by a high speed pass through path devoid of chopping knives, and wherein said low speed set of chopping knives comprises continuously rotatable front end chopping knives laterally spaced from continuously rotatable tail end chopping knives by a low speed pass through path devoid of chopping knives, the high and low speed pass through paths of said sets of high and low speed chopping knives being aligned respectively with the high and low speed pass through paths of said sets of high and low speed trim knives;

traversing means for shifting said trim station and said chopping station transversely with respect to the mill pass line to alternatively locate one or of the other of said sets of high or low speed trim knives and chopping knives in active positions at which their pass through paths are aligned with the mill pass line; and switch means for directing the product across an actively positioned set of high or low speed trim knives in the following sequence:

(a) to the front end trim knives to sever the product front end for chopping by the front end chopping knives;

(b) from the front end trim knives to the pass through path, allowing continued movement of said product along the mill pass line; and (c) from the pass through path to the tail end trim knives to sever the product tail end for chopping by the back-end chopping knives.

* * * * *